United States Patent [19]
Everts

[11] Patent Number: 5,181,369
[45] Date of Patent: Jan. 26, 1993

[54] BATTERY POWERED LINE TRIMMER

[75] Inventor: Robert G. Everts, Chandler, Ariz.

[73] Assignee: Inertia Dynamics Corporation, Chandler, Ariz.

[21] Appl. No.: 799,902

[22] Filed: Nov. 26, 1991

Related U.S. Application Data

[63] Continuation of Ser. No. 663,447, Mar. 1, 1991.

[51] Int. Cl.⁵ .................. B26B 7/00; A01D 35/00
[52] U.S. Cl. .......................... 56/12.7; 30/276
[58] Field of Search ............ 56/12.7, 12.8, 239, 56/17.4; 30/276, 296 R; D8/8

[56] References Cited

U.S. PATENT DOCUMENTS

| | | | |
|---|---|---|---|
| D. 250,450 | 12/1978 | Tiedemann | 56/12.7 |
| D. 255,764 | 7/1980 | Lombard | D8/8 |
| D. 301,009 | 5/1989 | Pilatowicz et al. | D8/8 |
| 303,483 | 9/1989 | Takahashi et al. | . |
| D. 317,852 | 7/1991 | Fujiwara et al. | D8/8 |
| 3,886,716 | 6/1975 | Sellers | 56/17.4 |
| 4,052,789 | 10/1977 | Ballas, Sr. | 56/12.7 X |
| 4,237,610 | 12/1980 | Bradus et al. | 30/276 |
| 4,391,041 | 7/1983 | Porter-Bennett | 30/296 R |
| 4,571,831 | 2/1986 | White, III | 56/12.7 X |
| 4,688,376 | 8/1987 | Wolfe, Sr. | 56/12.7 X |
| 4,825,548 | 5/1989 | Driggers | 56/12.7 X |
| 4,860,451 | 8/1989 | Pilatowicz et al. | . |

Primary Examiner—Thuy M. Bui
Attorney, Agent, or Firm—Brooks & Kushman

[57] ABSTRACT

A battery powered line trimmer possessing a relatively high ratio of mass moment of inertia about a vertical axis extending through its center of gravity to mass. The device comprising a motor and head assembly at the forward end and a rechargeable battery pack at the rearward end of a support shaft. Also, adjustable handles, for supporting the line trimmer, attached about either side of the center of gravity.

8 Claims, 2 Drawing Sheets

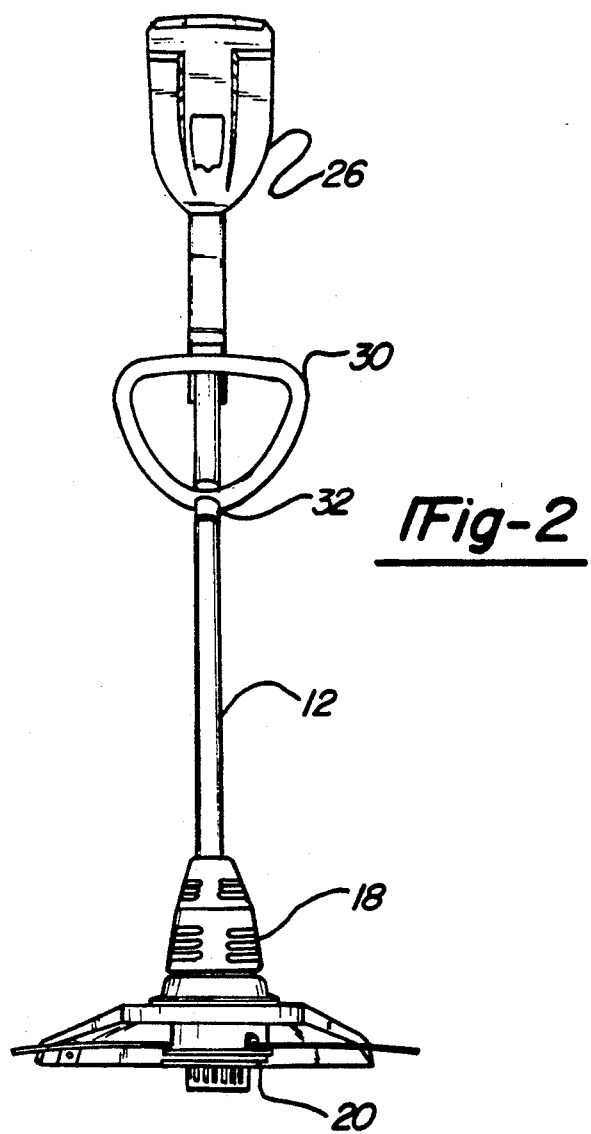
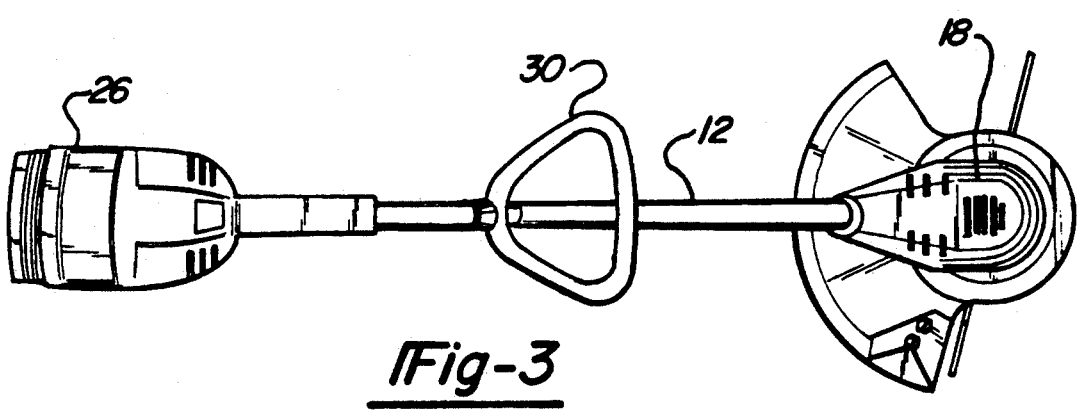

5,181,369

BATTERY POWERED LINE TRIMMER

This is a continuation of copending U.S. patent application Ser. No. 07/663,447 filed on Mar. 1, 1991.

TECHNICAL FIELD

This invention relates generally to line trimmers for cutting vegetation and has particular reference to battery powered line trimmers with a relatively high ratio of mass moment of inertia about a vertical axis to mass.

BACKGROUND ART

Line trimming devices are known in the prior art which, when held in the operating position, have high relative mass moments of inertia about a vertical axis. However, these devices have employed either a gas engine or an electric AC motor and attached power cord. They possess the ease of handling characteristics inherent in devices with high mass moments of inertia, more due to necessity rather than feel. This high mass moment of inertia helps to resist kickback when the line strikes a rigid object. On the other hand, prior battery operated line trimmers have not mounted the battery and motor as necessary to obtain these favorable handling characteristics. Accordingly, the principal desired objective of this invention is to mount the battery and motor so as to obtain an increased mass moment of inertia, and center of gravity balance between the handles of the trimmer, to significantly improve its handling characteristics. This device will, in particular, remain relatively stable in the hands of the operator when the cutting line strikes an object imposing a reaction torque on the trimmer.

SUMMARY OF INVENTION

The present invention contemplates a battery powered line trimmer with significantly improved handling characteristics over the prior art due to the configuration of its component parts.

The present invention further contemplates a battery pack enclosed in a handle mounted on the rearward end of the line trimmer shaft and a motor mounted with the head of the line trimmer at the forward end of the shaft. A second handle is located adjustably toward the middle of the shaft and adapted to hold the operator's hand at a position well extended above the center of gravity of the line trimmer. The location and relative lightweight of these components provides for a relatively high ratio of mass moment of inertia about a vertical axis to mass, and a center of gravity located between the two handles, thus improving the handling characteristics of the battery powered line trimmer.

Specifically, the present invention contemplates a battery powered line trimmer having a mass moment of inertia in excess of 40 slug-inches squared and preferably ranging from 60–150 slug-inches squared.

The invention also contemplates a ratio of mass moment of inertia about a vertical axis to mass, ranging from 150–400 in$^2$ and preferably being about 250 to 300 in$^2$.

These and other advantages of the present invention will become apparent upon consideration of the following detailed description taken with the accompanying drawings.

BRIEF DESCRIPTION OF DRAWINGS

FIG. 2 is a front view of the line trimmer of FIG. 1; and

FIG. 3 is a plan view of the line trimmer of FIG. 1.

BEST MODE FOR CARRYING OUT THE INVENTION

Figure 1:
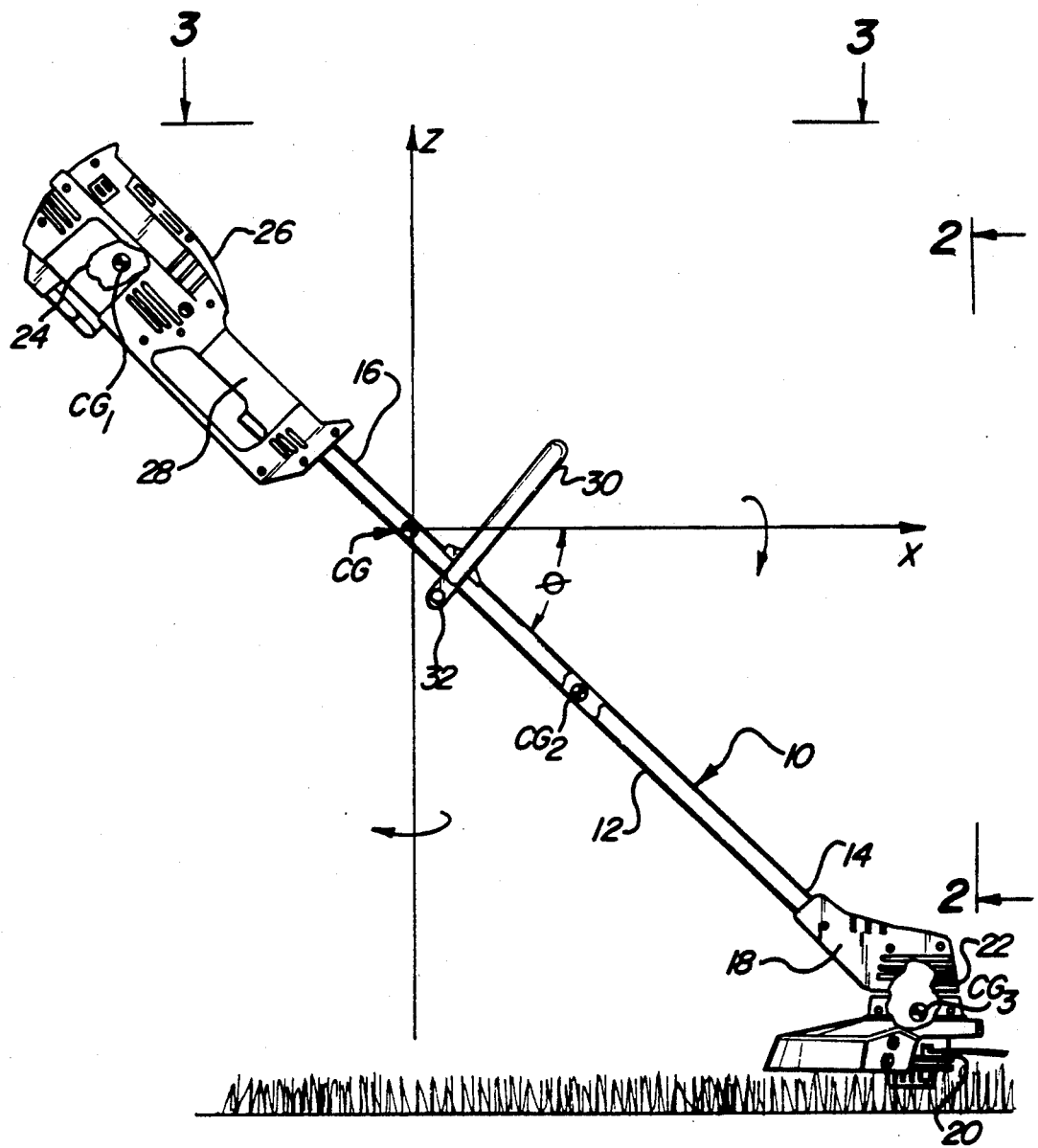
FIG. 1 is a side view of the battery powered line trimmer, of the present invention, in the operating position.

FIGS. 1-3, show a battery powered line trimmer 10 consisting of a shaft 12 with a forward end 14 and a rearward end 16. Fastened to the forward end 14 is a motor housing 18 and a cutting head 20. The motor housing 18 contains an electric motor 22, electrically linked to the battery 24 at the rearward end of the shaft 16.

The battery 24 is enclosed in a handle casing 26, the handle casing 26 is in turn fastened to the rearward end of the shaft 16. Molded into the handle casing 26 is the rear handle 28. The front handle 30 clamps to the shaft 12 by way of a bolt 32 which causes the handle 30 to clamp down on the shaft 12 when tightened. This method of attachment allows the axial position of the front handle 30 to be adjusted up or down the shaft 12 before tightening the bolt 32, thus balancing the center of gravity (CG) between the two handles 28, 30.

FIG. 1 shows a vertical axis Z generally normal to the ground through the center of gravity (CG) of the overall line trimmer 10. Also shown is a horizontal axis X generally parallel to the ground through the center of gravity of the overall line trimmer 10. In addition, FIG. 1 shows the location of the center of gravity (CG$_1$) of the battery 24 and handle casing 26; the location of the center of gravity (CG$_2$) of the shaft 12 and front handle 30; and the location of the center of gravity (CG$_3$) of the motor 22, motor housing 18 and head 20. The combination of these locations of the centers of gravity, with the mass and geometry of the various components, produce a mass moment of inertia about a vertical axis through the center of gravity.

This mass moment of inertia can be "normalized" by dividing such value by the overall mass of the line trimmer. For clarity purposes, the foregoing normalized mass moment of inertia is herein referred to as the "ratio" of mass moment of inertia to mass.

Through experimentation, and in the process of evaluating handling characteristics of alternatively powered line trimmers, i.e., gas engines an AC electric motor powered line trimmers, the inventors have developed a battery powered line trimmer having superior balance and resistance to reaction torque where (i) the mass moment of inertia is established in excess of 40 slug-inches squared and preferably ranging from 60 to 150 slug-inches squared and (ii) the ratio of mass moment of inertia to mass is between 150 to 400 inches squared.

As given in the example appearing below, an exceptionally well-balanced, reaction torque resistant battery powered line trimmer is provided where the mass moment of inertia equals approximately 80 slug-in$^2$ and the ratio of mass moment of inertia to mass equals approximately 270 in$^2$.

Specific dimensional characteristics together with the specific calculations for computing the relevant design parameters are given below.

The calculations are made assuming the line trimmer is in the operating position, with an angle $\Theta$ from the horizontal equal to 35 degrees. The formulas used are common formulas and can be found in many references, such as Engineer in Training Review Manual, by Michael R. Lindeburg, PE, pages 9-15 and 9-20 (6th Edition, 1982).

The following calculations will determine the center of gravity of the line trimmer in its operating position:

$L_{CG}$ is the distance from the most rearward end of the handle casing 26 to the center of gravity of the overall line trimmer 10, as seen in FIG. 1.

$L_1 = 3.75$ inches. As seen in FIG. 1, this is the distance from the most rearward end of the handle casing 26 to the center of gravity ($CG_1$) of the battery 24 and handle casing 26 assembly.

$L_2 = 28.63$ inches. As seen in FIG. 1, this is the distance from the most rearward end of the handle casing 26 to the center of gravity ($CG_2$) of the shaft 12 and front handle 30 assembly.

$L_3 = 53.25$ inches. As seen in FIG. 1, this is the distance from the most rearward end of the handle casing 26 to the center of gravity ($CG_3$) of the motor 22 and motor housing 18, head 20 assembly.

$M1 = 0.206$ slugs. This is the mass of the battery pack, namely battery 24 and handle casing 26 assembly.

$M2 = 0.037$ slugs. This is the mass of the center section, namely shaft 12 and front handle 30 assembly.

$M3 = 0.054$ slugs. This is the mass of the front end, namely motor 22, motor housing 18 and head 20 assembly.

$L_{CG} = \Sigma M_i L_i / \Sigma M_i$
$L_{CG} = [M_1 L_1 + M_2 L_2 + M_3 L_3]/[M_1 + M_2 + M_3]$
$L_{CG} = [0.206(3.75) + 0.037(28.63) + 0.054(53.25)] / [2.06 + 0.037 + 0.054]$
$LCG = 15.85$ inches The following calculation will determine the mass moment of inertia of the front end, which will be recognized as approximating the shape of a sphere about the center of gravity (CG):

$I_{CG3} = (2/5) M r^2$
$M_3 = 0.054$ Slugs
$r_3 = 1.5$ inches. This is the radius of an approximated sphere.
$I_{CG3} = (2/5)(0.054)(1.5)^2$
$I_{CG3} = 0.049$ Slug-in$^2$ Now use parallel axis theorem;
$I_{CG} = I_{CG3} + ML^2$
$I_{CG} = I_{CG3} + M_3[(L_3 - L_{CG})\cos\Theta]^2$
$I_{CG} = 0.0486 + 0.054[(53.25 - 15.85)\cos 35°]^2$
$I_{CG} = 50.73$ Slug-in$^2$ The following calculation will determine the mass moment of inertia of the shaft 12 and front handle 30 assembly, which is approximated as a slender rod, about the center of gravity (CG);

$I_{YCG2} = (\frac{1}{2}) M r^2$
$I_{ZCG2} = (1/12) ML^2$
$M_2 = 0.037$ slugs
$r_2 = 0.4$ inches (This is the radius of the shaft 12.)
$L = L_3 - r_3 - 2L_1$
$L = 44.25$ inches
$I_{YCG2} = (\frac{1}{2})(0.037)(0.4)^2$
$I_{YCG2} = 0.0020$ slug-in$^2$
$I_{ZCG2} = (1/12)(0.037)(44.25)^2$
$I_{ZCG2} = 6.04$ slug-in$^2$ Now use parallel axis theorem and coordinate rotation;

$ML^2 \cos\theta^2 + [(I_Y - I_X)\cos\theta + I_X]$
$I_{CG} = [I_{ZCG2} + M_2(L_2 - L_{CG})^2]\cos\Theta - I_{YCG2}]\cos\Theta + I_{YCG2}$
$I_{CG} = [6.04 + 0.037(28.63 - 15.85)^2 \cos 35° - 0.002]\cos 35° + 0.002$ $I_{CG} = 9.00$ slug-in$^2$ The following calculation will determine the mass moment inertia of the rear end about the center of gravity (CG) which approximates the shape of a circular cylinder of radius r:

$I_{YCG1} = (\frac{1}{2}) M r^2$
$I_{ZCG1} = (1/12) M(3r^2 + L^2)$ }
$M_1 = 0.206$ slugs
$r_1 = 1.5$ inches. (This is the approximate radius of the battery pack 24.)
$L = 6$ inches. (This is the length of the battery pack 24.)
$I_{YCG1} = (\frac{1}{2})(0.206)(1.5)^2$
$I_{YCG1} = 0.232$ slug-in$^2$
$I_{ZCG1} = (1/12)(0.206)[3(1.5)^2 + 6^2]$
$I_{ZCG1} = 0.734$ slug-in$^2$ Now use parallel axis theorem;
$I_{CG} = [I_{ZCG1} + M_1(L_1 - L_{CG})^2 \cos\Theta - I_{YCG1}]\cos\Theta + I_{YCG1}$
$I_{CG} = [0.734 + 0.206(3.75 - 15.85)^2 \cos 35° - 0.232]\cos 35° + 0.232$
$I_{cg} = 20.88$ slug-in$^2$ The following summation of the mass moments of inertia of the individual assemblies will determine the overall mass moment of inertia about the center of gravity of the line trimmer:

$I = 50.73 + 9.00 + 20.88 = 80.61$ slug-in$^2$

The mass moment of inertia, normalized by mass is the following:

$I/M_{tot}$
$M_{tot} = M_1 + M_2 + M_3$
$M_{tot} = 0.297$ slugs
$I/M_{tot} = 80.61/0.297$
$I/M_{tot} = 271$ in$^2$ The relatively high mass moment of inertia about a vertical axis extending through the center of gravity will create a greater resistance to the reaction torque a line trimmer will produce when the cutting line strikes a heavy object. Obviously, the higher its value, particularly with a unit having a higher overall mass, the greater will be the resistance to reaction torque. However, as a practical matter, an upper design limit of about 150 slug-in$^2$ can be established which is deemed adequate to accommodate any normally expected impediments which the cutting line may strike.

The final criteria for exceptional overall performance is the normalized mass moment of inertia, and here, where it is obviously desirable for operator endurance purposes that the unit be as lightweight as practicable, the more desirable value will be at upper end of the range with 400 being a practical limit.

While the best mode for carrying out the invention has been described in detail, those familiar with the art to which this invention relates will recognize various alternative designs and embodiments for practicing the invention as defined by the following claims.

What is claimed is:

1. A battery powered line trimmer for cutting vegetation, the trimmer comprising:

an elongated shaft having a forward end and a rearward end;

an electric motor having an output member for rotating a cutting line, the electric motor affixed to the forward end of the elongated shaft and aligned relative thereto so that the output member extends downwardly and has a generally vertical axis of rotation when the trimmer is oriented in an operative position, wherein the elongated shaft inclines rearwardly from the electric motor and the cutting line rotates in a plane generally parallel to the ground;

a battery pack affixed to the rearward end of the elongated shaft;

a front handle cooperative with the elongated shaft having a grip for one hand of an operator located rearward of the electric motor and forward of the center of gravity of the trimmer in the operative position; and a rear handle cooperative with the elongated shaft having a grip for the other hand of the operator located forward of the battery pack and rearward of the center of gravity of the trimmer in the operative position, wherein the front and rear handles are located above the center of gravity of the trimmer in the operative position, and the electric motor and battery pack spaced apart locations result in a relatively high moment of inertia about a vertical axis extending through the center of gravity so that the trimmer remains relatively stable in the hands of the operator when the cutting line strikes an object imposing a reaction torque on the trimmer.

2. The battery powered line trimmer of claim 1 wherein the overall line trimmer, in the operating position, possesses a ratio of mass moment of inertia about a vertical axis extending through the center of gravity to mass of the line trimmer greater than 150 inches-squared.

3. The battery powered line trimmer of claim 2 wherein the overall line trimmer, in the operating position, possesses a ratio of mass moment of inertia about a vertical axis extending through the center of gravity to mass of the line trimmer ranging from about 150 to 400 inches-squared.

4. The battery powered line trimmer of claim 1 wherein the overall line trimmer, in the operating position, possesses a mass moment of inertia about a vertical axis extending through the center of gravity in excess of 40 slug-inches-squared.

5. The battery powered line trimmer of claim 4 wherein the overall line trimmer, in the operating position, possesses a mass moment of inertia about a vertical axis extending through the center of gravity greater than about 60 slug-inches-squared, but less than about 150 slug-inches-squared.

6. The battery powered lined trimmer of claim 1 wherein the overall line trimmer in the operating condition possesses a mass moment of inertia about a vertical axis extending through the center of gravity of about 80 slug-inches-squared and a normalized mass moment of inertia of about 270 inches-squared, and said front handle being located forward of the center of gravity of the trimmer in the operative position, said operative position being at an angle of said elongated shaft relative to a surface being trimmed of about 35°.

7. A battery powered line trimmer for cutting vegetation, the trimmer comprising:

an elongated shaft having a forward end and a rearward end;

an electric motor having an output member for rotating a cutting line, the electric motor affixed to the forward end of the elongated shaft and aligned relative thereto so that the output member extends downwardly and has a generally vertical axis of rotation when the trimmer is oriented in an operative position, wherein the elongated shaft inclines rearwardly from the electric motor and the cutting line rotates in a plane generally parallel to the ground;

a battery pack affixed to the rearward end of the elongated shaft;

a front handle cooperative with the elongated shaft having a grip for one hand of an operator located rearward of the electric motor and forward of the center of gravity of the trimmer in the operative position; and a rear handle cooperative with the elongated shaft having a grip for the other hand of the operator located forward of the battery pack and rearward of the center of gravity of the trimmer in the operative position, wherein the front and rear handles are located above the center of gravity of the trimmer in the operative position, and the electric motor and battery pack spaced apart locations result in a ratio of moment of inertia about a vertical axis extending through the center of gravity to mass is in excess of 150 inches-squared and a mass moment of inertia about a vertical axis extending through the center of gravity greater than 60 slug-inches-squared, but less than 150 slug-inches squared, so that the trimmer remains relatively stable in the hands of the operator when the cutting line strikes an object imposing a reaction torque on the trimmer.

8. The battery powered line trimmer of claim 7 wherein the elongated shaft is inclined about 35° relative to a surface being trimmed when the trimmer is oriented in the operative position.

* * * * *